Aug. 16, 1932.  J. L. DRAKE  1,872,425
PROCESS AND APPARATUS FOR PRODUCING SHEET GLASS
Filed May 13, 1929
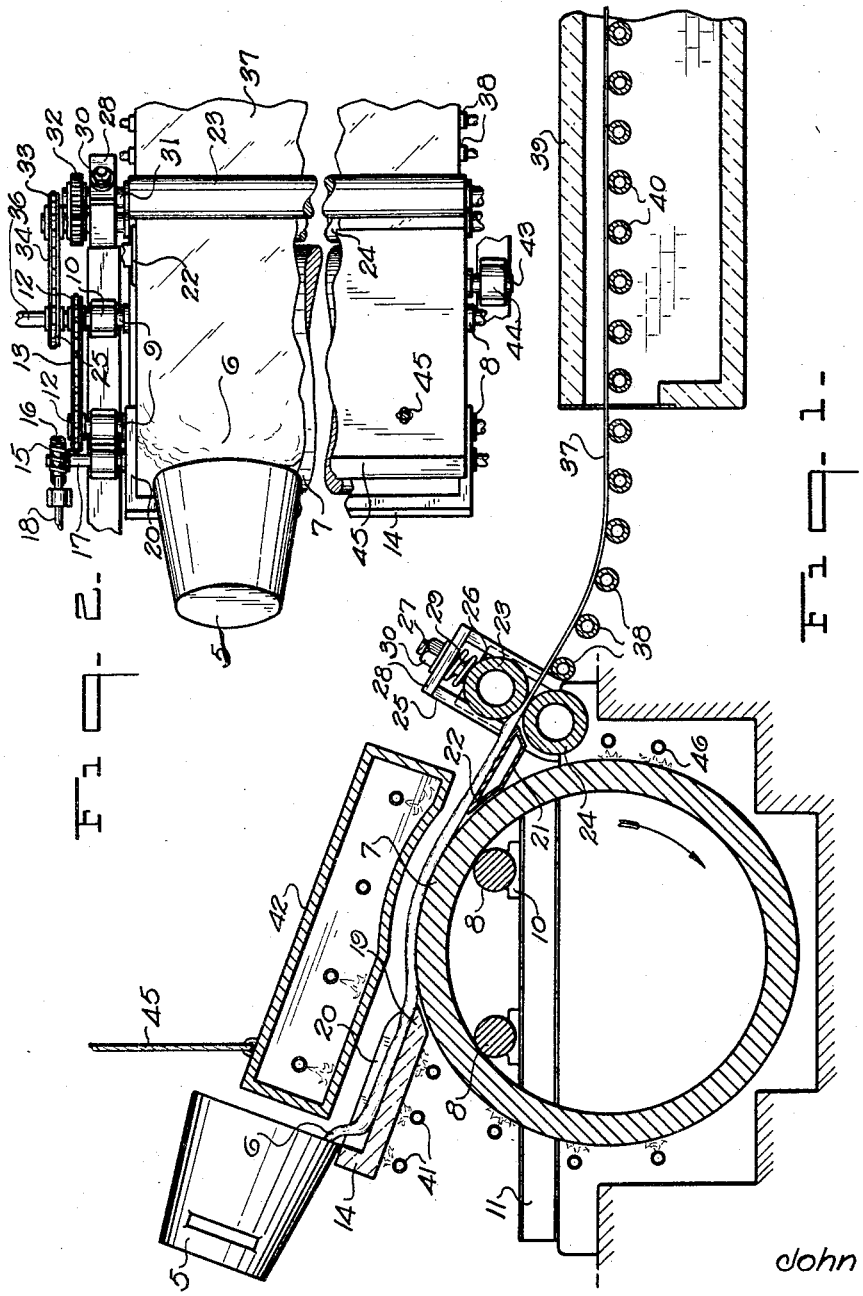

Patented Aug. 16, 1932

1,872,425

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed May 13, 1929. Serial No. 362,474.

The present invention relates to a process and apparatus for producing sheet glass.

An important object of the invention is to provide a process and apparatus wherein sheets of glass are intermittently produced by creating a relatively shallow moving mass of molten glass which is advanced toward a sheet forming pass and reduced to a sheet having a substantially predetermined and uniform thickness, after which the sheet is conveyed to and through an annealing leer.

Another object of the invention is to provide such means wherein a potful of glass is flowed in a manner that the glass will be reduced to a relatively thin wide stream without overlapping and without entrapping air, etc., the stream of molten glass being conveyed to and through a sheet forming pass, the temperature of the molten glass being properly controlled in its movement from the pot toward the sheet forming pass, the said sheet passing from the forming means to and through an annealing leer.

Other objects and advantages of the invention will become more apparent during the course of the following description when taken in connection with the accompanying drawing.

In the drawing wherein like numerals are employed to designate like parts throughout the same, Fig. 1 is a vertical longitudinal section through a form of the apparatus, and Fig. 2 is a fragmentary plan view of the apparatus.

This invention relates more particularly to the production of sheets from so-called "pot glass". The quality of pot glass as regards seeds and blisters is ordinarily exceptionally good and therefore the use of such glass is extremely desirable in the production of plate glass blanks. Glass is produced in pots by arranging a series of pots in a suitable furnace, filling the various pots with glass patch ingredients, and then subjecting the same to proper temperatures, which, together with a sufficient lapse of time, will create molten glass. The temperatures may then be varied to effect settling and refining of the molten glass. Usually glass in the pots remains in a quiescent state during the melting and refining thereof, although batch ingredients may be introduced into the pot several times so that a full pot of glass will be formed. In other words, the batch ingredients take up more room than the molten glass produced therefrom, but after the batch has been melted the glass is ordinarily not disturbed during the refining stages, at least the final refining stages.

In the past it has been customary to make plate glass blanks from such glass by pouring the entire contents of a pot upon a casting table, after which a suitable roll has been used to roll the glass out into sheet form. Due to the manner employed in pouring the glass from the pots and the rolling of the glass, the glass has been permitted to overlap. This overlapping is objectionable, not only because of entrapping bubbles, but also because there is a slight skin formation on the molten glass which does not flow together entirely during the overlapping operation. This obviously causes defects to be introduced in the blank being formed.

In accordance with the present process, the molten glass is so handled that the possibility of overlapping of the glass is greatly reduced with obvious advantageous results.

Referring to the drawing, the numeral 5 designates a pot. This pot is of suitable size and may be formed from the ordinary refractory clay or other material. As illustrated, molten glass 6 is being flowed from the pot, the glass 6 having previously been suitably prepared in the receptacle 5.

The numeral 7 designates a preferably large rotatable member or drum which may be supported upon the cylinders 8. The cylinders 8 are carried by the shafts 9 which may be supported in the journals 10 mounted on the beams 11. The shafts extend through the journals 10 as illustrated in Fig. 2, each being provided with a sprocket wheel 12 so that a sprocket chain 13 may be trained about the two sprockets. One of the shafts is longer than the other and extends past its respective sprocket wheel 12 and is connected to a suitable source of power. Upon rotation of the driven shaft and by reason of the sprocket chain 13 passing over both sprockets 12, the cylinders 8 will be driven in the same direction. The rotatable member 7 is hollow as shown in Fig. 1 with the cylindrical members arranged through the drum and supporting the same by contacting with the upper inner surface of the drum as shown. Upon rotation of the cylinders and by reason of frictional contact between the cylinders and the inner face of the drum, the drum will be rotated at a speed dependent upon the movement of the cylinders. With the apparatus as shown, the drum is rotated in a direction indicated by the arrow. However, the drum may be mounted in a centrally disposed shaft suitably journaled and connected to a variable speed drive.

Arranged in proximity to the uppermost part of the periphery of the drum is an adjustable support 14. The support 14 is mounted on a suitably journaled shaft 15 carrying a worm wheel 16 which meshes with a worm 17 carried by the shaft 18, which also carries a hand wheel, whereby upon rotation of the hand wheel, the support 14 may be tilted as desired. Ordinarily the end 19 of the support is arranged relatively close to the periphery of the drum passing thereby. It will be noted that the support 14 is arranged in an inclined position so that as the glass flows from the receptacle 5 onto the support 14, it will flow downwardly along said support and be discharged upon the periphery of the drum 7. The glass will have a tendency to spread laterally upon the support 14 in a manner to create a relatively wide, shallow stream which is restricted in its lateral movement by the sides 20 on the support 14.

A stripping slab 21, which is also preferably disposed in an inclined position and which is provided to receive the stream of glass from the drum, is arranged as shown in Fig. 1. The glass being conveyed by the drum from the support 14 to the stripping slab 21 will further spread laterally so that by the time the glass reaches the stripping slab 21, the stream will be almost as wide as the desired width of sheet to be produced. The end 22 of the slab 21 is preferably arranged very close to the surface of the drum so that the glass will be readily stripped or removed from said drum.

A pair of rotatable members 23 and 24 are arranged to create a sheet forming pass. The roll 24 is mounted in and carried by the bracket 25, while the roll 23 is mounted in and carried by the adjustable slide block 26 operable in the bracket 25. The slide block 26 carries a threaded shaft 27 operating through the end 28 of the bracket. A resilient member 29 is interposed between the top of the slide block and the bottom of the member 28 whereby to normally urge the adjustable roll 23 toward the stationary roll 24. A nut 30 is operable on the shaft 27 to control the space or pass between the two rolls 23 and 24. Although the rolls will normally be held as close as the adjustment of the nut 30 will permit, the spring 29 is provided to permit a temporary separation of the rolls so that foreign matter, such as clay, etc. may pass between the rolls without causing damage thereto. The foreign matter may be introduced into the molten glass by a breaking away of the pot or otherwise so that the safety feature just mentioned is quite desirable.

The rolls 23 and 24 are carried in their respective mountings by means of shafts 31 which also carry intermeshing gears 32 whereby upon positive rotation of one roll, the other roll will be positively driven in the opposite direction. One of the shafts also carries a sprocket wheel 33 over which runs a sprocket chain 34 driven by a sprocket 35 mounted on the main drive shaft 36. Obviously, the use of suitable clutch means and gear changing means for the various moving parts of the apparatus is contemplated.

It will be seen that the sheet forming rolls are arranged near the lower or exit end of the stripping slab 21 to receive the molten glass and to reduce it to a sheet 37 having a substantially predetermined and uniform thickness, the thickness of which is controlled by the space between the rolls. A conveyor 38 composed of a series of rolls is provided to receive and direct the sheet toward the annealing leer 39. The annealing leer is likewise provided with a series of rolls 40 to support and convey the sheet through the leer, the temperature of which is controlled to effect suitable and proper annealing of the sheet. However, it is to be distinctly understood that the sheet may be conveyed on any desirable type of conveyor as the use of rolls is not absolutely necessary.

In producing a sheet, the pot 5 containing properly refined molten glass is placed in operative association with the support 14 and tilted so that the molten glass flows from the pot onto the support. Burners or other heating elements 41 are provided to control the temperature of the support 14 and likewise assist in maintaining the temperatures of the glass. The support or receptacle 14 is arranged in an inclined position so that the glass will flow by gravity downwardly and in its descent will have a tendency to spread laterally, thereby increasing its width and decreasing its thickness. The glass then flows upon the periphery of the drum which further spreads the glass without overlapping and directs it toward the stripping slab 21. It will be noted that the drum 7 elevates the glass slightly, thus assisting in reducing the thickness of the glass.

A suitable hood 42 is provided to protect and assist in maintaining the temperature of the molten glass passing thereunder. Suitable temperature control means are associated with the hood to accomplish this result. The hood may be pivoted at one end by means of a shaft 43 journaled in the bearing 44, while the opposite end may be provided with a cable or the like 45 to raise and lower the same about the point of pivot.

The glass flows from the drum onto the stripping slab 21. This is called a stripping slab because it will prevent the glass sticking to the drum, although it also serves in the capacity of a conveyor or directing means for guiding the molten glass from the drum to the sheet forming rolls. It will be noted that the stream of molten glass being supplied to the forming rolls is relatively thin. Of course, as compared to the thickness of the sheet 37, the glass before it is rolled is relatively thick, but as compared to the large masses of molten glass heretofore rolled, this stream of glass is relatively thin. It can be seen from the drawing that the glass stream is sufficiently thin to reduce to a minimum the tendency toward overlapping of the glass, etc. As the glass sheet is thinner than the stream, the peripheral speed of the forming rolls is relatively greater than the movement of the stream of glass toward the forming pass to prevent backing up of the glass at this point. During the rolling operation, the peripheral speed of the conveyor rolls and leer conveyor is the same as the forming rolls. After the sheet has been formed, however, the speed of the sheet may be varied as desired by changing the speed of its supporting members. Temperature control means in the nature of burners 46 have been illustrated for action upon the drum 7, and it will also be understood that any suitable medium may also be employed inwardly of the drum to assist in controlling its temperature.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of intermittently producing a plurality of successive sheets of glass, consisting in periodically pouring a mass of molten glass on an inclined support in a manner that the glass will not overlap appreciably, said glass then flowing onto a moving surface where it is spread laterally into a relatively wide, thin stream, then stripping the stream from the moving surface, and then rolling the stream after it leaves said surface into sheet form.

2. In sheet glass apparatus, an inclined support for receiving a mass of molten glass thereon and down which the glass flows and increases in width while simultaneously decreasing in thickness, a relatively large rotatable drum disposed at one end of the support for receiving the glass therefrom and effecting a further lateral spreading thereof to form a relatively thin wide stream, an inclined stationary member disposed at the opposite side of the drum for stripping the glass therefrom, and a pair of rotatable rolls disposed at the end of the stripping member remote from the drum for receiving the stream of molten glass and reducing it to final sheet thickness.

3. In sheet glass apparatus, an inclined support for receiving a mass of molten glass thereon and down which the glass flows and increases in width while simultaneously decreasing in thickness, a relatively large rotatable drum disposed at one end of the support for receiving the glass therefrom and effecting a further lateral spreading thereof to form a relatively thin wide stream, an inclined stationary member disposed at the opposite side of the drum for stripping the glass therefrom, and a pair of rotatable rolls disposed at the end of the stripping member remote from the drum for receiving the stream of molten glass and reducing it to final sheet thickness, said drum projecting upwardly above the adjacent ends of the inclined support and stripping member.

4. In sheet glass apparatus, an inclined support for receiving a mass of molten glass thereon and down which the glass flows and increases in width while simultaneously decreasing in thickness, a relatively large rotatable drum disposed at one end of the support for receiving the glass therefrom and effecting a further lateral spreading thereof to form a relatively thin wide stream, an inclined stationary member disposed at the opposite side of the drum for stripping the glass therefrom, a pair of rotatable rolls disposed at the end of the stripping member remote from the drum for receiving the stream of molten glass and reducing it to final sheet thickness, a temperature controlled hood arranged above the inclined support and drum, means for pivotally mounting one end of the hood, and means for raising and lowering the opposite end thereof.

5. In sheet glass apparatus, an inclined support for receiving a mass of molten glass thereon and down which the glass flows and increases in width while simultaneously decreasing in thickness, a relatively large rotatable drum disposed at one end of the support for receiving the glass therefrom and effecting a further lateral spreading thereof to form a relatively thin wide stream, an inclined stationary member disposed at the opposite side of the drum for stripping the glass therefrom, a pair of rotatable rolls disposed at the end of the stripping member remote from the drum for receiving the stream of molten glass and reducing it to final sheet thickness, said drum projecting upwardly above the adjacent ends of the inclined support and stripping member, a temperature controlled hood arranged above the inclined support and drum, means for pivotally mounting one end of the hood, and means for raising and lowering the opposite end thereof, said hood having a concave bottom portion positioned above the drum and having a curvature corresponding to that of said drum.

6. The process of intermittently producing a plurality of successive sheets of glass, consisting in periodically pouring a mass of molten glass onto an inclined support, flowing the glass from said support onto a revolving surface where it is spread laterally into a relatively thin, wide stream, stripping the stream from said revolving surface, and in feeding the stream after it leaves said surface through a sheet forming pass wherein it is reduced to sheet form.

7. The process of intermittently producing a plurality of successive sheets of glass, consisting in periodically pouring a mass of molten glass onto an inclined support, flowing the glass from said support onto a moving surface where it is spread laterally into a relatively thin, wide stream, stripping the stream from said moving surface and sliding it over and in contact with a stationary surface, and in then rolling the stream to sheet form as it leaves said stationary surface.

8. The process of intermittently producing a plurality of successive sheets of glass, consisting in periodically pouring a mass of molten glass onto an inclined support, flowing the glass from said support onto a revolving surface where it is spread laterally into a relatively thin, wide stream, stripping the stream from said revolving surface and sliding it over and in contact with a stationary surface, and in feeding the stream as it leaves said stationary surface through a sheet forming pass wherein it is reduced to sheet form.

Signed at Toledo, in the county of Lucas and State of Ohio, this 11th day of May, 1929.

JOHN L. DRAKE.